(12) United States Patent
Zanotti et al.

(10) Patent No.: US 7,729,849 B2
(45) Date of Patent: Jun. 1, 2010

(54) METHOD FOR DETECTING THE ANGULAR POSITION OF A KNOB FOR THE GAS OF A MOTORCYCLE

(75) Inventors: Massimo Zanotti, Vado (IT); Claudio Grossi, Quarto Inferiore (IT); Loris Lambertini, Crespellano (IT)

(73) Assignee: Magneti Marelli Powertrain S.p.A. (IT)

( * ) Notice: Subject to any disclaimer, the term of this patent is extended or adjusted under 35 U.S.C. 154(b) by 296 days.

(21) Appl. No.: 12/018,296

(22) Filed: Jan. 23, 2008

(65) Prior Publication Data

US 2008/0295801 A1    Dec. 4, 2008

(30) Foreign Application Priority Data

Jun. 4, 2007    (EP) .................................. 07425345

(51) Int. Cl.
G06F 19/00    (2006.01)
G01B 7/30     (2006.01)
G01C 17/38    (2006.01)

(52) U.S. Cl. .................. 701/114; 702/151; 73/1.75; 701/110; 324/207.25

(58) Field of Classification Search ......... 701/101–103, 701/110, 114, 115; 73/1.75; 324/207.23, 324/207.25; 702/150, 151, 182, 183, 186
See application file for complete search history.

(56) References Cited

U.S. PATENT DOCUMENTS

| | | | |
|---|---|---|---|
| 5,933,005 A * | 8/1999 | Pugh ..................... | 324/207.25 |
| 6,089,535 A   | 7/2000 | Mizutani et al. ...... | 251/129.04 |
| 7,188,021 B2 * | 3/2007 | Spicer et al. ............ | 701/103 |
| 7,552,615 B2 * | 6/2009 | Kuwata et al. ............ | 73/1.75 |
| 7,571,073 B2 * | 8/2009 | Gamberini et al. ......... | 702/151 |
| 2005/0000268 A1 * | 1/2005 | Kuwata et al. ............ | 73/1.75 |
| 2007/0132449 A1 * | 6/2007 | Madni et al. ........... | 324/207.25 |

FOREIGN PATENT DOCUMENTS

| | | | |
|---|---|---|---|
| EP | 1 338 500 A1 | 8/2003 | |
| EP | 1 722 085 A1 | 11/2006 | |

* cited by examiner

*Primary Examiner*—Willis R Wolfe, Jr.
(74) *Attorney, Agent, or Firm*—Woodcock Washburn LLP

(57) ABSTRACT

A method for detecting the angular position of a gas knob of a motorcycle; the method presents the steps of: detecting simultaneously four mutually redundant measurements of the angular position of the gas knob by means of two mutually independent angular-position sensors forming part of an acquisition system; making a cross comparison two by two between the four measurements for diagnosing any possible malfunctioning of the angular-position sensors; and determining the angular position of the gas knob, using at least one measurement supplied by an angular-position sensor operating properly.

27 Claims, 2 Drawing Sheets

METHOD FOR DETECTING THE ANGULAR POSITION OF A KNOB FOR THE GAS OF A MOTORCYCLE

TECHNICAL FIELD

The present invention relates to a method for detecting the angular position of a knob for the gas of a motorcycle.

BACKGROUND ART

A traditional motorcycle comprises a gas knob (conventionally the knob set to the right of the handlebar), which is rotatably mounted and is mechanically connected to a control of the engine that regulates generation of the torque. Normally, the gas knob is connected to the control of the engine by means of at least one metal cable of a Bowden type, which is inserted within an external sheath to slide with respect to the sheath itself and is pushed by a spring towards a resting position corresponding to a zero torque.

Recently, drawing upon the experience accumulated in the automotive sector, also in motorcycles there has been proposed the application of drive-by-wire (DBW) systems, in which the gas knob is no longer mechanically connected with the control of the engine, but is only connected with an angular-position sensor that detects the position of the gas knob and consequently drives an actuator that acts mechanically on the control of the engine.

The greater problems that must be faced in the design of a DBW system suited for being used in a motorcycle is the production of an acquisition system for detecting the angular position of the gas knob. In fact, said acquisition system must be able to interpret rapidly and without any possibility of error the intention of the driver to accelerate/decelerate, must provide an information redundancy such as to render certain the interpretation of the intention of the driver by an electronic control unit for controlling the engine, and must be installable in the context of a motorcycle, taking into account the problems linked to the encumbrance, the high level of vibrations that may occur in a motorcycle, and the adverse environmental conditions linked to the absence of protection (accidental bumps, very low or very high temperature, splashes of water, etc.).

Furthermore, an acquisition system suitable for being used in a motorcycle must be extremely versatile in order to be readily integratable in motorcycles that are even very different from one another in so far as the production of motorcycles is very fragmented and characterized by a vast production of models frequently with small volumes.

In the automotive sector, there exist different solutions for making an acquisition system for detecting the position of the pedal of the gas. However, said solutions for automobiles cannot be used for a motorcycle since it is too cumbersome and not sufficiently robust. Furthermore, in motorcycle applications the reliability and rapidity in interpreting the intentions of the driver is even more important than in automobile applications in so far as an automobile resting on four wheels is intrinsically stable and hence in driving an automobile it is tolerable (i.e., it is not substantially dangerous) for there to be a brief deviation between the torque supplied and the intention of the driver. Instead, a motorcycle, given that it rests just on two wheels, is intrinsically unstable and is based upon a dynamic equilibrium that can be readily upset also by a brief deviation between the torque supplied and the intention of the driver (particularly during limit conditions, such as on a bend).

DISCLOSURE OF INVENTION

The aim of the present invention is to provide a method for detecting the angular position of a knob for the gas of a motorcycle that will be free from the drawbacks described above and, in particular, easy and inexpensive to produce.

According to the present invention, a method for detecting the angular position of a knob for the gas of a motorcycle is provided as claimed in the attached Claims.

BRIEF DESCRIPTION OF THE DRAWINGS

The present invention will now be described with reference to the annexed plates of drawings, which illustrate some non-limiting examples of embodiment thereof, in which.

PREFERRED EMBODIMENTS OF THE INVENTION

Figure 1:
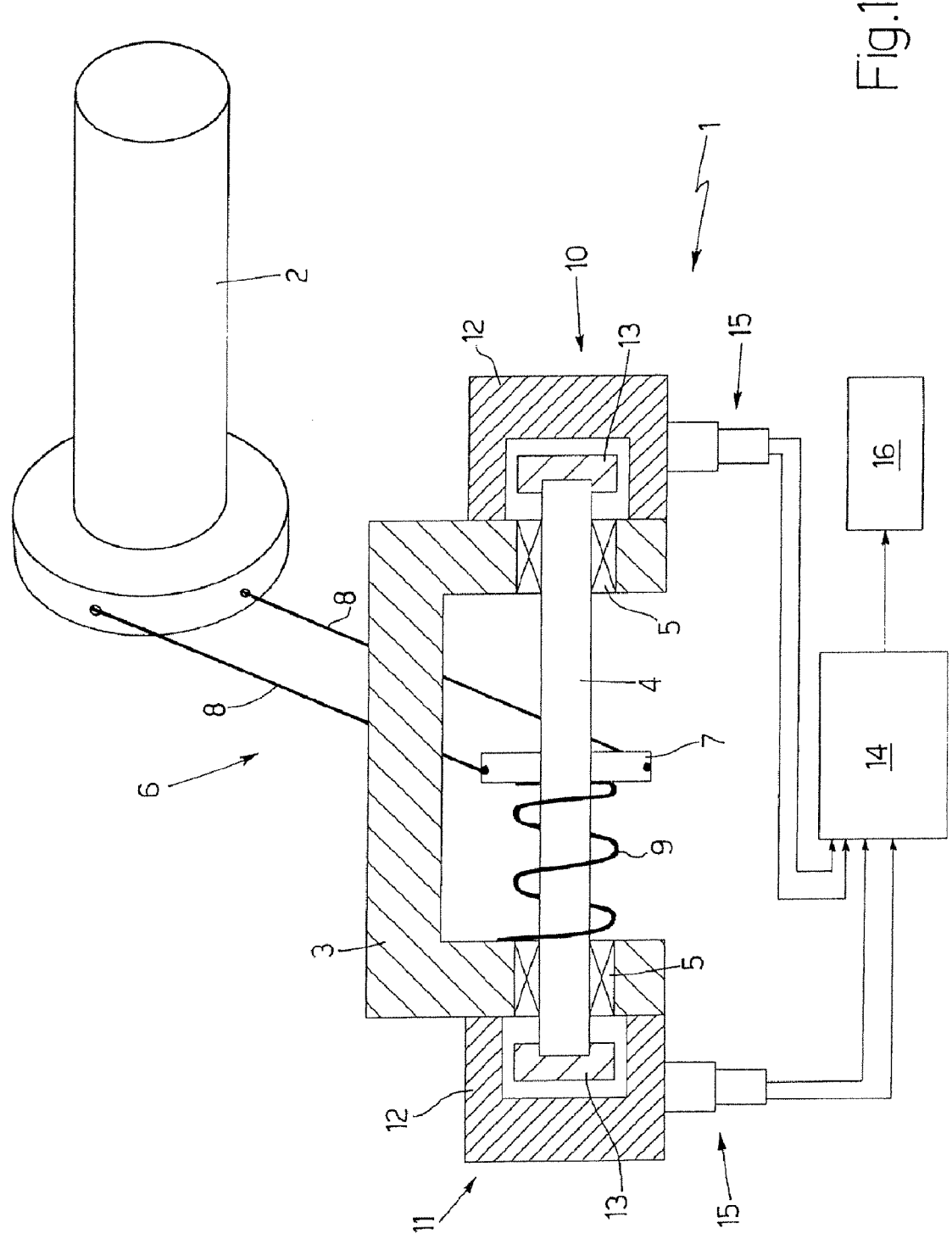
FIG. 1 is a schematic view of an acquisition system for detecting the angular position of a knob for the gas of a motorcycle built in accordance with the present invention.

In FIG. 1, the reference number 1 designates as a whole an acquisition system for detecting the angular position α of a gas knob 2 of a motorcycle for a control system of a DBW type.

The acquisition system 1 comprises a fixed supporting body 3, which is set at a certain distance from the gas knob 2 and is C-shaped. Housed in the supporting body 3 is a mobile element constituted by a rotating shaft 4, which is mounted idle by means of a pair of bearings 5 so as to be able to turn freely around a central axis of its own. The rotating shaft 4 exits from the fixed supporting body 3 at two opposite ends of the rotating shaft 4 itself and is mechanically connected to the gas knob 2 by means of a transmission device 6 that transmits motion from the gas knob 2 to the rotating shaft 4 itself.

According to the embodiment illustrated in FIG. 1, the transmission device 6 is of the cable type and comprises a sheave 7 of a push-pull type, fixed with respect to the rotating shaft 4 and a pair of cables 8 of a Bowden type (i.e., housed in a slidable way within respective external sheaths), each of which has one end constrained to the gas knob 2 and one opposite end, fixed with respect to the sheave 7. The sheave 7 is set in a position of centre of the rotating shaft 4 itself and hence is housed in a protected position within the fixed supporting body 3.

According to a different embodiment (not illustrated), the transmission device 6 is of the cable type and comprises a sheave 7 fixed with respect to the rotating shaft 4 and a single cable 8 of a Bowden type, which has one end constrained to the gas knob 2 and one opposite end fixed with respect to the sheave 7 in such a way that the gas knob 2 is rendered angularly fixed with respect to the rotating shaft 4.

According to a further embodiment (not illustrated), the rotating shaft 4 is coaxial to the knob 2, and the transmission device 6 comprises a direct mechanical connection for rendering the rotating shaft 4 angularly fixed with respect to the knob 2.

Normally, there is provided a return spring 9 set around the rotating shaft 4 for pushing with a given force the rotating shaft 4 itself towards a resting position corresponding to a zero torque.

Housed on the fixed supporting body 3 are two angular-position sensors 10 and 11, which are separate from and independent of one another and are coupled to the rotating shaft 4 at the opposite ends of the rotating shaft 4 itself for determining the angular position α of the rotating shaft 4 that corresponds exactly to the angular position α of the gas knob 2 in so far as the gas knob 2 is angularly fixed with respect to the rotating shaft 4. Each angular-position sensor 10 or 11 has a fixed part or stator 12, fixed with respect to the fixed supporting body 3, and a mobile part or rotor 13, fixed with respect to the rotating shaft 4. Furthermore, each angular-position sensor 10 or 11 is designed to provide two mutually redundant measurements of the angular position α of the rotating shaft 4; in this way, altogether four mutually redundant measurements of the angular position α of the rotating shaft 4 are supplied.

Finally, the acquisition system 1 comprises a processing unit 14, which is connected to both of the angular-position sensors 10 and 11 and uses the signals supplied by the angular-position sensors 10 and 11 for determining, with a high degree of certainty the angular position α of the rotating shaft 4 (i.e., of the gas knob 2). In particular, the processing unit 14 uses one of the four measurements available for determining the angular position α of the rotating shaft 4, whilst it uses all four measurements available for verifying proper operation of the angular-position sensors 10 and 11, i.e., for verifying and validating (i.e., confirming) the angular position α of the rotating shaft 4. In other words, the processing unit 14 uses the cross comparison between the four measurements available for diagnosing any possible malfunctioning of the angular-position sensors 10 and 11.

According to a preferred embodiment, each angular-position sensor 10 or 11 is connected to the processing unit 14 by means of a wiring 15 of its own (comprising connectors and cable) independent of the other angular-position sensor 11 or 10. Furthermore, the connectors of the wiring 15 of the angular-position sensor 10 can be physically different (as regards shape and/or dimensions) from the connectors of the wiring 15 of the angular-position sensor 11 in such a way as to prevent the wiring 15 of the two angular-position sensors 10 and 11 from possibly being erroneously reversed during assembly (i.e., reversal of the wiring 15 of the two angular-position sensors 10 and 11 is rendered mechanically impossible). Reversal of the wiring 15 of the two angular-position sensors 10 and 11 is very dangerous in so far as the processing unit 14 could interpret a resting position (i.e., zero torque corresponding to the operation at slow running or idling) as a position of maximum demand of performance.

The processing unit 14, on the basis of the angular position α of the rotating shaft 4 (i.e., of the gas knob 2) controls an electrical actuator 16, which acts mechanically upon a control of an engine of the motorcycle for adjusting generation of the torque; by way of example, for a petrol-fueled internal-combustion engine the electrical actuator 16 controls the angular position α of a throttle valve, which regulates the flowrate of the air taken in by the engine.

Figure 2:
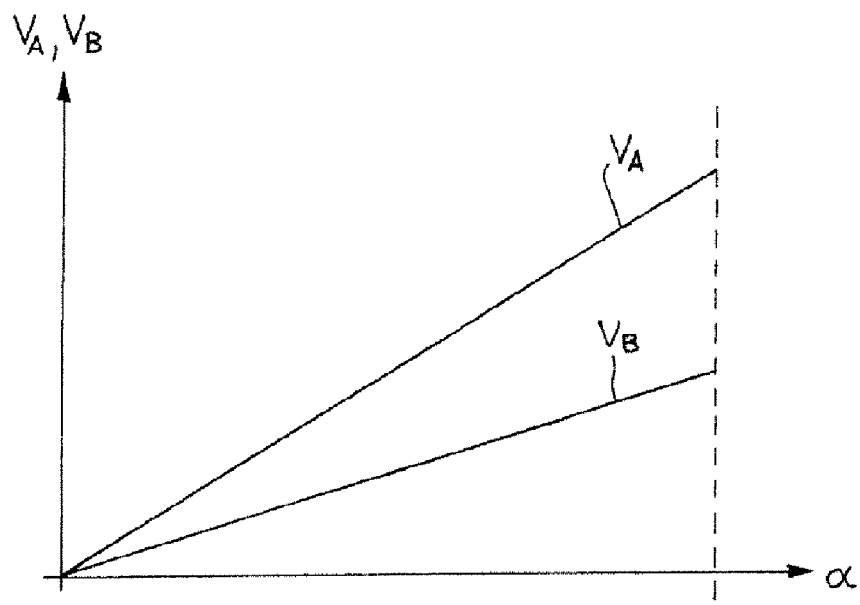
FIG. 2 is a graph of the two outputs of a first sensor of angular position of the acquisition system of FIG. 1.
Figure 3:
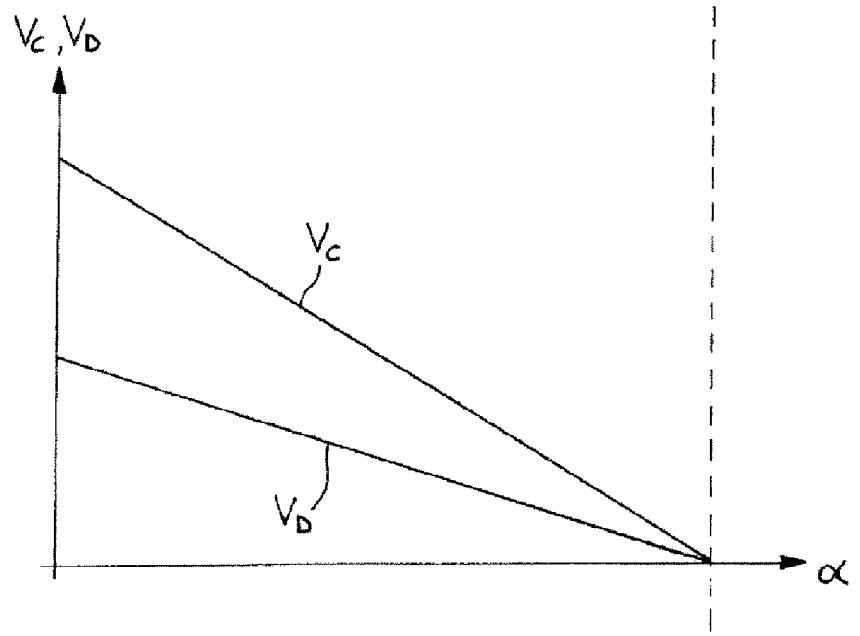
FIG. 3 is a graph of the two outputs of a second sensor of angular position of the acquisition system of FIG. 1.

According to a preferred embodiment illustrated in FIGS. 2 and 3, each angular-position sensor 10 or 11 is a double potentiometer having two ratiometric and linear outputs in the range 0-5 V and in which a measurement $V_B$ and $V_D$ of the angular position α of the rotating shaft 4 is equal to half of the other measurement $V_A$ or $V_C$ of the angular position α of the rotating shaft 4. By way of example, the measurements $V_A$ and $V_B$ supplied by the angular-position sensor 10 as a function of the angular position α of the rotating shaft 4 are illustrated in FIG. 2 and the measurements $V_C$ and $V_D$ supplied by the angular-position sensor 11 as a function of the angular position α of the rotating shaft 4 are illustrated in FIG. 3.

Preferably, the two measurements $V_C$ and $V_D$ of the angular position α of the rotating shaft 4 of the angular-position sensor 11 follow a law different with respect to the two measurements $V_A$ and $V_B$ of the angular position α of the rotating shaft 4 of the angular-position sensor 10 so as to be able to highlight better any possible problems (for example, an electrical failure that determines a variation of the electrical potential of the electrical ground). Said situation is immediately evident by comparing the graph of FIG. 2 for the angular-position sensor 10 and the graph of FIG. 3 for the angular-position sensor 11. In other words, the measurements $V_A$ and $V_B$ of the angular position α of the rotating shaft 4 of the angular-position sensor 10 increase as the angular position α of the rotating shaft 4 increases, whilst the measurements $V_C$ and $V_D$ of the angular position α of the rotating shaft 4 of the angular-position sensor 11 decrease as the angular position α of the rotating shaft 4 increases, with a rate of variation equal and opposite to the rate of variation of the measurements $V_A$ and $V_B$ of the angular position α of the rotating shaft 4 of the angular-position sensor 10. In this way, the sum of a measurement $V_A$ or $V_B$ of the angular position α of the rotating shaft 4 of the angular-position sensor 10 remains constant with a measurement $V_C$ or $V_D$ of the angular position α of the rotating shaft 4 of the angular-position sensor 11.

As mentioned previously, the processing unit 14 uses the cross comparison between the four measurements $V_A$, $V_B$, $V_C$ and $V_D$ available for diagnosing any possible malfunctioning of the angular-position sensors 10 and 11. The cross comparison between the four measurements $V_A$, $V_B$, $V_C$ and $V_D$ available envisages, for example, making the following verifications:

$$V_A = 2*V_B \pm \text{Tolerance}_1 \qquad [1]$$

$$V_C = 2*V_D \pm \text{Tolerance}_1 \qquad [2]$$

$$V_A + V_C = K_1 \pm \text{Tolerance}_2 \qquad [3]$$

$$V_B + V_D = K_2 \pm \text{Tolerance}_2 \qquad [4]$$

$$2*V_B + V_C = K_3 \pm \text{Tolerance}_2 \qquad [5]$$

$$2*V_D + V_A = K_4 \pm \text{Tolerance}_2 \qquad [6]$$

In the equations [1]-[6] appearing above, $K_1$, $K_2$, $K_3$ and $K_4$ are verification constants linked to the constructional characteristics of the angular-position sensors 10 and 11, whilst Tolerance$_1$ and Tolerance$_2$ are predefined threshold values that take into account the inevitable errors of measurement committed by the angular-position sensors 10 and 11.

According to a preferred embodiment, to be able to compensate adequately for all the constructional and assembly tolerances the values of the verification constants $K_1$, $K_2$, $K_3$ and $K_4$ are not established a priori, but are determined during an initial calibration step of the acquisition system 1. In other words, the first time that the acquisition system 1 is set in operation (i.e., the very first time that the ignition key of the motorcycle that is equipped with the acquisition system 1 is turned), the acquisition system 1 goes automatically into a calibration or self-learning condition, in which the tester must get the gas knob 2 to make some rotations with the engine turned off. During these rotations, the processing unit 14 determines the effective values of the verification constants $K_1$, $K_2$, $K_3$ and $K_4$ that it will use subsequently. Preferably, the processing unit 14 determines a number of values for each verification constant $K_1$, $K_2$, $K_3$ and $K_4$ to be able to make a possibly weighted average (the last values measured may be more significant than the first values measured in so far as, during the first rotations of the gas knob 2 there may occur minor mechanical settling).

As mentioned previously, the first time that the acquisition system 1 is set in operation (i.e., the very first time that the ignition key of the motorcycle that is equipped with the acquisition system 1 is turned), the acquisition system 1 goes automatically into a calibration or self-learning condition. At the start of said calibration condition, before the tester carries out some rotations of the gas knob 2 with the engine turned off, the processing unit 14 measures the effective angular position α of the rotating shaft 4 (i.e., of the gas knob 2) corresponding to the resting position (i.e., zero torque). In other words, as soon as the ignition key is turned without switching the engine on (in any case turning-on of the engine is inhibited up to end of the calibration condition), the tester must not touch the gas knob 2 to enable the processing unit 14 to measure the effective angular position α of the rotating shaft 4 (i.e., of the gas knob 2) corresponding to the resting position (i.e., zero torque). In this way, it is possible to make up for all the constructional and assembly tolerances and moreover it is possible to verify that the assembly of the acquisition system 1 has been carried out properly. If it is verified that the assembly of the acquisition system 1 has not been carried out properly (typically as a result of a reversal of the wiring 15 of the angular-position sensors 10 and 11), it is necessary to limit severely the performance of the engine, typically inhibiting starting or, enabling just idling of the engine.

According to a different embodiment, whenever the ignition key the processing unit 14 is turned, it measures the effective angular position α of the rotating shaft 4 (i.e., of the gas knob 2) corresponding to the resting position (i.e., zero torque) and inhibits engine ignition until the correctness of said measurement is verified, i.e., the correspondence of said measurement with an expected value.

As mentioned previously, the processing unit 14 uses the cross comparison between the four measurements $V_A$, $V_B$, $V_C$ and $V_D$ available for diagnosing any possible malfunctioning of the angular-position sensors 10 and 11. The cross comparison between the four measurements $V_A$, $V_B$, $V_C$ and $V_D$ available envisages, for example, carrying out the verifications described in the equations [1]-[6] given above. If all the verifications are positive (i.e., if all the equations [1]-[6] are verified within the predefined tolerance margins), then the four measurements available of the angular position α of the rotating shaft 4 are all correct and equivalent. At this point, the processing unit 14 uses one of these four available measurements of the angular position α of the rotating shaft 4.

According to a preferable embodiment, the angular-position sensor 10 is considered as the main one and in conditions of normal operation one of the measurements (always the same) supplied by the main angular-position sensor 10 is used. To limit the costs, the auxiliary or control angular-position sensor 11 could have a precision lower than that of the main angular-position sensor 10. Said choice does not limit the overall performance and reliability of the acquisition system 1, but only involves an increase of the predefined threshold values Tolerance, and Tolerance$_2$ present in the equations [1]-[6] given above.

According to a different embodiment, for determining the measurement of the angular position α of the rotating shaft 4 the processing unit 14 performs an arithmetic mean between the two measurements $V_A$ and $V_B$ supplied by the main angular-position sensor 10 (if the two angular-position sensors 10 and 11 have different precision), or else performs an arithmetic mean between the four measurements $V_A$, $V_B$, $V_C$ and $V_D$ supplied by the main angular-position sensors 10 and 11 (if the two angular-position sensors 10 and 11 have the same precision).

If the verifications performed by the processing unit 14 are not all positive (i.e., if not all the equations [1]-[6] are verified within the predefined tolerance margins), then the processing unit 14 identifies the potentiometer or potentiometers that has/have failed of the angular-position sensors 10 and 11 and excludes the measurement (or measurements) $V_A$, $V_B$, $V_C$ and $V_D$ corresponding to the potentiometer or potentiometers that has/have failed of the angular-position sensors 10 and 11. Furthermore, in the event of failure in the angular-position sensors 10 and 11, the processing unit 14 activates a condition of emergency (referred to also as recovery condition), in which the performance of the engine is limited in a way increasing as a function of the increase in the number of potentiometers failed of the angular-position sensors 10 and 11. In the case of failure of just one potentiometer of the angular-position sensors 10 and 11, the performance of the engine is slightly limited, enabling travel at a speed slightly lower than the nominal performance (for example, it is not possible to exceed 130 km/h). In the case of failure of two potentiometers of the angular-position sensors 10 and 11 the performance of the engine is limited, enabling travel at a much lower speed with respect to the nominal performance (for example, it is not possible to exceed 50 km/h). In the case of failure of three potentiometers of the angular-position sensors 10 and 11 the performance of the engine is markedly limited, only enabling operation at a constant r.p.m. (for example, at idling or at an r.p.m. slightly higher than that of idling), i.e., the motorcycle can travel at a very contained speed. It should be emphasized that in the case of failure of three potentiometers of the angular-position sensors 10 and 11 it is not possible to determine with certainty whether three or four potentiometers have failed and which potentiometer has not failed. Consequently, the choice is made to ignore the signal supplied by the gas knob 2 and to keep the engine at a constant r.p.m.

For example, in the case of electrical failure of the potentiometer of the angular-position sensor 10 that supplies the measurement $V_A$, the equations [1], [3] and [6] are not verified, whilst the equations [2], [4] and [5] are verified. Consequently, if the processing unit 14 determines that the equations [1], [3] and [6] are not verified whilst the equations [2], [4] and [5] are verified, then the processing unit 14 diagnoses a failure of the potentiometer of the angular-position sensor 10 that supplies the measurement $V_A$ and in no way uses the measurement $V_A$ for determining the angular position α of the rotating shaft 4 (i.e., of the gas knob 2).

For instance, in the case of electrical failure of both of the potentiometers of the angular-position sensor 10 or in the case of mechanical failure of the angular-position sensor 10, the measurements $V_A$ and $V_B$ are wrong and hence the equations [1], [3]-[6] are not verified, whilst only the equation [2] is verified. Consequently, if the processing unit 14 determines that the equations [1], [3]-[6] are not verified whilst only the equation [2] is verified, then the processing unit 14 diagnoses a failure of the angular-position sensor 10 and in no way uses the measurements $V_A$ and $V_B$ for determining the angular position α of the rotating shaft 4 (i.e., of the gas knob 2).

In the event of failure of at least three potentiometers of the angular-position sensors 10 and 11, none of the equations [1]-[6] is verified; consequently, if the processing unit 14 determines that the equations [1]-[6] are not verified, then the processing unit 14 diagnoses a failure of at least three potentiometers of the angular-position sensors 10 and 11. It should be noted that in this case, the processing unit 14 is not able to determine with certainty which potentiometer of the angular-position sensors 10 and 11 is functioning and in any case has no possibility of controlling the correctness of the measurement supplied by the potentiometer that has not failed.

The acquisition method described above presents numerous advantages in so far as it is simple and inexpensive to produce, is extremely flexible in so far as it can be easily installed on any type of motorcycle, and interfaces with a gas knob 2 of a traditional type, thus reducing the investments necessary for its implementation. In particular, the acquisition method described above enables maintenance of a gas knob 2 of a traditional type having a cable connection (well proven and reliable). Consequently, the supporting body 3 can be installed in a very protected area both with respect to possible falls or accidental bumps and with respect to atmospheric and environmental agents. Furthermore, the acquisition method described above guarantees a standard solution for a DBW motorcycle system and integrates in a single object all the functions of "gas demand" and all the redundancies required by safety.

Furthermore, the acquisition method described above enables a precise and above all very reliable measurement of the angular position α of the rotating shaft 4 (i.e., of the gas knob 2) to be obtained, and even in the event of limited failure of the angular-position sensors 10 and 11 enables travel of the motorcycle in conditions of a high level of safety.

The invention claimed is:

1. A method for detecting the angular position (α) of a gas knob (2) of a motorcycle; the method comprises the steps of:
    detecting simultaneously four mutually redundant measurements ($V_A$, $V_B$, $V_C$, $V_D$) of the angular position (α) of the gas knob (2) by means of two mutually independent angular-position sensors (10, 11) forming part of an acquisition system (1);
    making a cross comparison two by two between the four measurements ($V_A$, $V_B$, $V_C$, $V_D$) for diagnosing any possible malfunctioning of the angular-position sensors (10, 11); and determining the angular position (α) of the gas knob (2), using at least one measurement ($V_A$, $V_B$, $V_C$, $V_D$) supplied by an angular-position sensor (10, 11) operating properly.

2. The method according to claim 1, wherein the angular position (α) of the gas knob (2) is assumed as being equal to a single measurement supplied by an angular-position sensor (10, 11) operating properly.

3. The method according to claim 1, wherein the angular position (α) of the gas knob (2) is assumed as being equal to an average of at least two measurements supplied by at least one angular-position sensor (10, 11) operating properly.

4. The method according to claim 1, wherein whenever the acquisition system (1) is set in operation, the acquisition system (1) goes automatically into a calibration condition, in which the effective angular position (α) of the gas knob (2) is measured corresponding to the resting position.

5. The method according to claim 1, wherein a return spring is provided, set around the rotating shaft (4) for pushing the rotating shaft (4) itself with a given force towards a resting position corresponding to a zero torque.

6. The method according to claim 1, wherein the first time that the acquisition system (1) is set in operation, the acquisition system (1) goes automatically into a calibration condition, in which the effective angular position (α) of the gas knob (2) is measured corresponding to the resting position.

7. The method according to claim 6, wherein turning-on of the engine of the motorcycle is inhibited if the effective angular position (α) of the gas knob (2) corresponding to the resting position does not correspond to an expected value.

8. The method according to claim 1, wherein each sensor (10; 11) of position is connected to a processing unit (14) of the acquisition system (1) by means of a wiring (15) of its own, independent of the other angular-position sensor (11; 10).

9. The method according to claim 8, wherein connectors of the wiring (15) of a first angular-position sensor (10) are physically different from the connectors of the wiring (15) of a second angular-position sensor (11).

10. The method according to claim 1, and comprising the further step of limiting the performance of an engine of the motorcycle in the case of failure in at least one angular-position sensor (10, 11).

11. The method according to claim 10, wherein the performance of the engine is limited in a way increasing as a function of the increase in the number of wrong measurements ($V_A$, $V_B$, $V_C$, $V_D$).

12. The method according to claim 10, wherein:
    in the event of just one wrong measurement ($V_A$, $V_B$, $V_C$, $V_D$), the performance of the engine is slightly limited, enabling travel at a lower speed with respect to the nominal performance;
    in the event of two wrong measurements ($V_A$, $V_B$, $V_C$, $V_D$), the performance of the engine is limited, enabling travel at a much lower speed with respect to the nominal performance,
    in the event of three wrong measurements ($V_A$, $V_B$, $V_C$, $V_D$), the performance of the engine is markedly limited, only enabling operation at constant r.p.m.

13. The method according to claim 1, wherein the cross comparison two by two between the four wrong measurements ($V_A$, $V_B$, $V_C$, $V_D$) supplied by the angular-position sensor (10, 11) envisages verification of the following equations:

$$V_A = 2*V_B \pm \text{Tolerance}_1 \quad [1]$$

$$V_C = 2*V_D \pm \text{Tolerance}_1 \quad [2]$$

$$V_A + V_C = K_1 \pm \text{Tolerance}_2 \quad [3]$$

$$V_B + V_D = K_2 \pm \text{Tolerance}_2 \quad [4]$$

$$2*V_B + V_C = K_3 \pm \text{Tolerance}_2 \quad [5]$$

$$2*V_D + V_A = K_4 \pm \text{Tolerance}_2 \quad [6]$$

$V_A$, $V_B$, $V_C$, $V_D$ are the four measurements supplied by the angular-position sensor (10, 11);
$K_1$, $K_2$, $K_3$, $K_4$ are four constants of verification;
Tolerance$_1$ is a first predefined threshold value that takes into account the errors of measurement committed by the angular-position sensors (10, 11);
Tolerance$_2$ is a second predefined threshold value that takes into account the errors of measurement committed by the angular-position sensors (10, 11).

14. The method according to claim 13, wherein:
    if all six equations [1]-[6] are verified within the predefined tolerance margins, then both of the angular-position sensors (10, 11) function properly and all four measurements ($V_A$, $V_B$, $V_C$, $V_D$) supplied by the angular-position sensor (10, 11) are correct;
    if only three of the six equations [1]-[6] are verified within the predefined tolerance margins, then an angular-position sensor (10, 11) is partially failed and one of the four measurements ($V_A$, $V_B$, $V_C$, $V_D$) supplied by the angular-position sensors (10, 11) is wrong;

if only one of the six equations [1]-[6] is verified within the predefined tolerance margins, then at least one angular-position sensor (10, 11) is partially failed and two of the four measurements ($V_A, V_B, V_C, V_D$) supplied by the angular-position sensors (10, 11) are wrong;

if none of the six equations [1]-[6] is verified within the predefined tolerance margins, then both of the angular-position sensors (10, 11) are at least partially failed and at least three of the four measurements ($V_A, V_B, V_C, V_D$) supplied by the angular-position sensors (10, 11) are wrong.

15. The method according to claim 13 and comprising the further step of learning the effective value of the verification constants ($K_1, K_2, K_3, K_4$) during a initial calibration step of the acquisition system (1).

16. The method according to claim 15, wherein the first time that the acquisition system (1) is set in operation, the acquisition system (1) goes automatically into a calibration condition, in which a tester must get the gas knob (2), with the engine turned off, to make some rotations to determine the effective values of the verification constants ($K_1, K_2, K_3, K_4$).

17. The method according to claim 1, wherein the acquisition system (1) comprises:
a fixed supporting body (3);
a rotating shaft (4), rotatably mounted in the supporting body (3) and mechanically coupled to the two angular-position sensors (10, 11); and
a transmission device (6), mechanically connected to the gas knob (2) and to the rotating shaft (4) for transmitting the motion from the gas knob (2) to the rotating shaft (4) itself.

18. The method according to claim 17, wherein the transmission device (6) is of the cable type and comprises a sheave (7) of a push-pull type, fixed with respect to the rotating shaft (4) and a pair of cables of a Bowden type, each of which has one end constrained to the gas knob (2) and one opposite end, fixed with respect to the sheave (7).

19. The method according to claim 17, wherein the transmission device (6) is of the cable type and comprises a sheave (7), fixed with respect to the rotating shaft (4), and a cable of a Bowden type, which has one end constrained to the gas knob (2) and one opposite end, fixed with respect to the sheave (7).

20. The method according to claim 17, wherein the transmission device (6) comprises a direct mechanical connection for rendering the rotating shaft (4) coaxial and angularly fixed with respect to the knob (2).

21. The method according to claim 17, wherein the two angular-position sensors (10, 11) are set at the opposite ends of the rotating shaft (4).

22. The method according to claim 21, wherein the fixed supporting body (3) is C-shaped, and is traversed by the rotating shaft (4) that exits from the fixed supporting body (3) at two opposite ends of the rotating shaft (4) itself.

23. The method according to claim 22, wherein the transmission device (6) is of the cable type and comprises a sheave (7), fixed with respect to the rotating shaft (4) and set in a position of centre of the rotating shaft (4) itself, and at least one cable of a Bowden type, which has one end constrained to the gas knob (2) and one opposite end, fixed with respect to the sheave (7).

24. The method according to claim 1, wherein each main angular-position sensor (10, 11) is a double potentiometer.

25. The method according to claim 24, wherein for each angular-position sensor (10, 11) a measurement of the angular position ($\alpha$) of the rotating shaft (4) is equal to half of the other measurement of the angular position ($\alpha$) of the rotating shaft (4).

26. The method according to claim 25, wherein the two measurements of the angular position ($\alpha$) of the rotating shaft (4) of a first angular-position sensor (10) follow a law different with respect to the two measurements of the angular position ($\alpha$) of the rotating shaft (4) of a second angular-position sensor (11).

27. The method according to claim 26, wherein the measurements ($V_A, V_B$) of the angular position ($\alpha$) of the gas knob (2) supplied by a first angular-position sensor (10) increase as the angular position ($\alpha$) of the gas knob (2) increases, whilst the measurements ($V_C, V_D$) of angular position ($\alpha$) of the gas knob (2) of a second angular-position sensor (11) decrease as the angular position ($\alpha$) of the gas knob (2) increases, with a rate of variation equal and opposite to the rate of variation of the measurements ($V_A, V_B$) of the angular position ($\alpha$) of the gas knob (2) supplied by the first angular-position sensor (10).

* * * * *